Dec. 29, 1925.  
C. C. THOMAS  
1,568,008  
IMPLEMENT FOR REMOVING CORES FROM CITROUS FRUITS  
Filed May 9, 1925
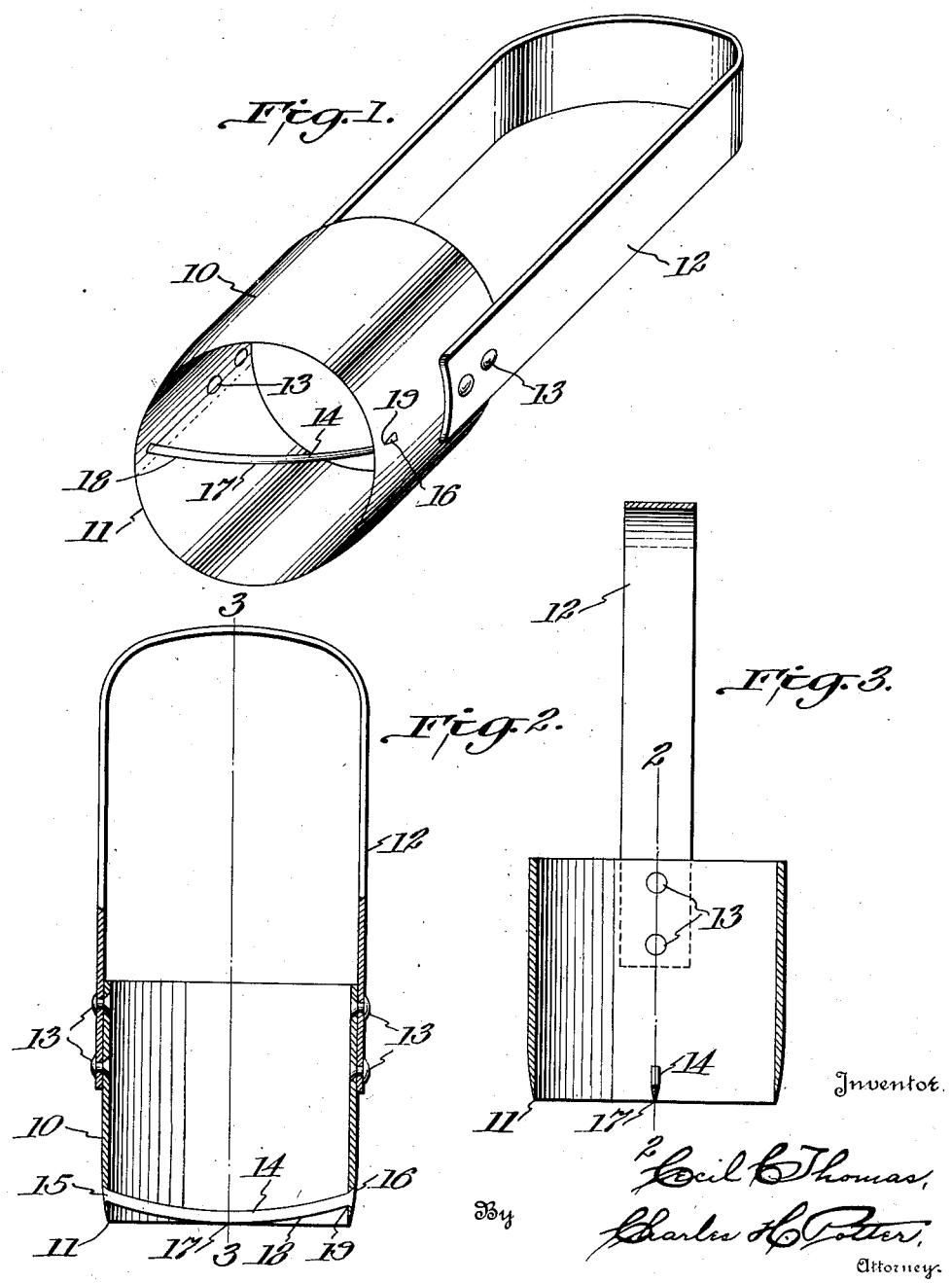
Inventor.  
Cecil C. Thomas,  
By Charles H. Potter,  
Attorney.

Patented Dec. 29, 1925.

1,568,008

UNITED STATES PATENT OFFICE.

CECIL C. THOMAS, OF TAKOMA PARK, MARYLAND.

IMPLEMENT FOR REMOVING CORES FROM CITROUS FRUITS.

Application filed May 9, 1925. Serial No. 29,116.

*To all whom it may concern:*

Be it known that CECIL C. THOMAS, citizen of the United States, residing at Takoma Park and State of Maryland, has invented certain new and useful Improvements in Implements for Removing Cores from Citrous Fruits, of which the following is a specification.

The invention relates to devices, especially hand implements, for removing the cores from grape-fruit, oranges, tangerines and other citrous fruits.

It is customary in the present-day modes of serving citrous fruits, especially grapefruit, to halve the fruit by cutting along a plane perpendicular to the core or axis. The pith and seeds are generally removed by some one of several methods. By means of a knife this operation is most commonly performed by making a V-section cut across the membranes and around the seed area and removing the severed conical section of core. This procedure is messy, slow and unsanitary and furthermore since the walls or membranes of the pulp sacs are not usually cut at the bottom, that is, adjacent the core end, the nose of the spoon snags at this point in taking out the pulp segments, causing much annnoyance and undue spattering of the juice.

Implements intended to facilitate or supplant this hand operation have heretofore been devised, but so far as I am aware none of these is entirely satisfactory and none remedies all of the difficulties mentioned. Furthermore, the known devices, other than the simple plain or curved knives, are too expensive to manufacture and are so complex in structure that their care in cleaning and rust-prevention becomes a nuisance.

I have succeeded in providing an implement for the purpose which is extremely simple in construction and of few parts and which quickly removes the core clean and in such manner that the pulp segments can readily be removed from the sacs with a spoon without danger of snagging of the latter at the bottom of the sac. My device is entirely sanitary and otherwise overcomes the recognized objections to the present operation of core removal, whether by means of the ordinary knife or with the use of the special coring devices heretofore known.

Briefly, the new implement comprises a cylindrical body, one end whereof is provided with a cutting edge, and a transverse cutting member within the cylindrical body and adjacent the cutting edge. The preferred forms which these elements may have and certain variations of the same will hereinafter appear.

The improvements will better be understood by reference to the accompanying drawing, wherein:

Fig. 1 is a perspective view of the preferred form of implement;

Fig. 2 is a sectional view along the line 2—2 of Fig. 3, and

Fig. 3 is a cross-section at right angle to the section shown in Fig. 2 and taken along the line 3—3 of Fig. 2.

A cylindrical body 10 is provided at one end with a cutting edge 11, while a handle 12 of any convenient form is securely fastened, as by rivets 13, to or along the opposite end of the body 10. The latter is preferably of metal, most suitably of stain- and rust-resistant alloy steel of which there are several varieties on the market. The tubular body need not be very thick, and in the interest of economy of both the metal and the fruit as well as for convenience in use the body should be as thin as is practicable without sacrifice of the necessary strength. The diameter of the body 10 is so chosen that it will just include the seed area of the particular variety of fruit, as will readily be understood. As to grape-fruit, it has been observed that this seed area is substantially the same, approximately two inches across the center, whatever the external diameter of the fruit may be. A smaller size of course is suitable for oranges and tangerines.

As shown, a transverse cutting member 14 extends diametrically across the body 10, being secured to said body at its ends 15, 16, in any suitable manner. As illustrated in Fig. 2, the ends of the member pass through small openings in the opposite walls of the body, in line with the center plane of the handle, and are upset to hold the cutting member 14 rigid.

The cutting member is located adjacent the annular cutting edge 11 of the body and for best results it is positioned and shaped as shown; it thus comprises a thin, narrow, curved blade, the center 17 of the bow of its edge 18 just touching the plane of the annular cutting edge 11. The thinner and narrower the blade is, the better suited it is for the particular purpose, but it must be strong enough to withstand the slight strains incident to use. Relative to the curvature of the cutting member 14, it may be varied considerably but is determined in general by the curvature of the inside of the rind. Experiment has shown that good results are obtained in an implement for coring grapefruit when the point 19 where the edge 18 intersects the inner wall of the cylindrical body portion 10 is between one-eighth and three-sixteenths of an inch from the edge 11.

The implement is employed as follows:

The fruit is cut in half in the usual manner, cross-wise of the core. By the medium of the handle 12 the cylindrical body is forced axially into the fruit around the core until by feel or otherwise it is determined that the edge 11 has passed through the pulp and membranes of the sacs and has struck the inner rind. During this operation the member 14 has followed the axial movement, splitting its way easily through the core. When the edge 11 of the cylindrical body strikes the rind as stated, either the implement or the fruit is given an angular movement until by the feel it is known that the core has become dislodged. The relative rotation required varies considerably but is somewhere between one hundred eighty degrees and a complete turn. A cylindrical plug comprising all of the core of the half of the fruit is thus completely severed and is removed upon withdrawal of the implement, the member 14 acting as a lifting key for the plug. From the cylinder the plug may be expelled through the top, the shape of the handle being preferably such as to facilitate this removal.

By curving the cutting member 14 and arranging the same as shown, it has been found that in cooperation with the action of the annular longitudinal cutter 11 it severs the lower inner portions of the pulp sacs from the rind and this permits unobstructed movement of the nose of the spoon into the central cavity of the fruit in removal of the pulp from the sacs. As the relative rotation between the implement and the fruit is applied, the lower portions of the membranes which are cut away from the sacs are torn loose from the rind and are pressed into a compact mass, part of which rides up on top of the cross member 14. The latter thereby provides an underlying key which lifts the mass and therefore the entire core plug upon withdrawal of the implement from the fruit. To a limited degree this is the case if the member 14 is straight but such form has been found to be much less practical and satisfactory. If a straight cross member is employed it may take the form of a fine wire. For the reasons stated, however, I prefer to use a curved blade of somewhat greater width than thickness.

While I have illustrated the body member 10 as a complete cylinder, it will be obvious that it may be sectional or provided with longitudinal slits and still perform the intended function to a greater or less extent. In general the part which the body 10 plays is answered by any member which is readily forced through the pulp to the bottom of the fruit half and which either by such movement or by such movement in combination with an angular movement serves to cut the membranes surrounding the seeds along lines parallel to the axis of the core in advance of the contact of the cross member 14 with the respective membranes as the relative movement is applied; and any such modification of the body 10 is understood to be the full equivalent in the appended claims except where specifically defined.

Also, while not so practical, the cross member 14 may extend only half way across the opening. If this is the case, the relative angular movement between the fruit and implement must of course be at least a full turn. A cross member which as shown lies in a single plane is preferred, but it may be curved without departing from the scope of the invention.

I claim:—

1. An implement for removing cores from citrous fruit comprising means for effecting a cut around the core and a cross member lying in a plane of the axis of the core and extending across the axis, said cross member being formed to sever the core adjacent the end of the latter upon relative rotation of the implement and fruit.

2. An implement for removing cores from citrous fruit comprising means for effecting a cut around the core and a cross member lying in and curved in a plane of the axis of the core and having a blade directed toward the end of the core, said cross member being formed to sever the core adjacent the end of the latter upon relative rotation of the implement and fruit.

3. An implement for removing cores from citrous fruit comprising means for effecting a cut around the core and, having cutting means at one end, and a cross member formed to sever the core adjacent the end of the latter upon relative rotation of the implement and fruit, said cross member having a curved blade directed toward the end of the core and extending centrally substantially to the plane of said cutting means.

4. An implement for removing cores from citrous fruit comprising means for effecting a cut around the core and having cutting means at one end, and a cross member formed to sever the core adjacent the end of the latter upon relative rotation of the implement and fruit, said cross member extending entirely across the core and having a curved blade directed toward the end of the core and extending centrally substantially to the plane of the said cutting means.

5. An implement for removing cores from citrous fruit comprising a cylindrical body, one end whereof is provided with a cutting edge, and a transverse curved blade within said cylindrical body adjacent said cutting edge and extending diametrically entirely across the space within said cylindrical body, said blade lying in a plane of the axis of the core and directed toward and extending centrally substantially to the plane of said cutting edge.

In testimony whereof I affix my signature.

CECIL C. THOMAS.